United States Patent
Wu et al.

(10) Patent No.: US 11,042,227 B2
(45) Date of Patent: Jun. 22, 2021

(54) WIRELESS VIRTUAL MOUSE

(71) Applicant: Shenzhen Polytechnic, Shenzhen (CN)

(72) Inventors: Bo Wu, Shenzhen (CN); Meifen Chen, Shenzhen (CN); Rong Lu, Shenzhen (CN); Ying Wang, Shenzhen (CN)

(73) Assignee: Shenzhen Polytechnic, Shenzhen (CN)

( * ) Notice: Subject to any disclaimer, the term of this patent is extended or adjusted under 35 U.S.C. 154(b) by 0 days.

(21) Appl. No.: 16/801,044

(22) Filed: Feb. 25, 2020

(65) Prior Publication Data
US 2020/0192493 A1 Jun. 18, 2020

Related U.S. Application Data

(63) Continuation of application No. PCT/CN2018/102160, filed on Aug. 24, 2018.

(30) Foreign Application Priority Data

Aug. 25, 2017 (CN) .......................... 201710747087.2

(51) Int. Cl.
*G06F 3/0346* (2013.01)
*G06F 3/01* (2006.01)
(Continued)

(52) U.S. Cl.
CPC ......... *G06F 3/0346* (2013.01); *G02B 27/017* (2013.01); *G06F 3/012* (2013.01);
(Continued)

(58) Field of Classification Search
CPC combination set(s) only.
See application file for complete search history.

(56) References Cited

U.S. PATENT DOCUMENTS

2016/0353988 A1   12/2016   Moller et al.
2017/0139567 A1*  5/2017    Li ........................... G06F 3/011

FOREIGN PATENT DOCUMENTS

| CN | 201945946 U | 8/2011 |
| CN | 105843397 A | 8/2016 |

(Continued)

OTHER PUBLICATIONS

International Search Report and Written Opinion with English Translation of ISR, cited in PCT/CN2018/102160 dated Nov. 20, 2018, 14 pages.

*Primary Examiner* — Robin J Mishler
(74) *Attorney, Agent, or Firm* — Cooper Legal Group, LLC

(57) ABSTRACT

The present disclosure discloses the wireless virtual mouse. The wireless virtual mouse comprises a head-mounted device and a wireless virtual mouse body. The wireless virtual mouse body comprises a head motion detection module, an eyelid blinking detection module, a communication module, and a power supply module. The head motion detection module collects relative changes of head position through an aerial attitude sensor. A wireless transceiver of the communication module sends signals generated based upon the relative changes of the head position to a computer, and a cursor on a screen of the computer changes synchronously based upon the signals. The eyelid blinking detection module collects a movement distance and a movement duration of an eyelid through a photoelectric motion sensor, and the wireless transceiver sends change signals generated based upon the movement distance and the movement duration to the computer.

18 Claims, 2 Drawing Sheets

(51) Int. Cl.
*G06F 3/038* (2013.01)
*G02B 27/01* (2006.01)

(52) U.S. Cl.
CPC ............ *G06F 3/013* (2013.01); *G06F 3/0383* (2013.01); *G06F 2203/0384* (2013.01)

(56) References Cited

FOREIGN PATENT DOCUMENTS

| | | |
|---|---|---|
| CN | 106889990 A | 6/2017 |
| CN | 107616797 A | 1/2018 |
| CN | 107643825 A | 1/2018 |
| CN | 207051855 U | 2/2018 |

\* cited by examiner

WIRELESS VIRTUAL MOUSE

RELATED APPLICATIONS

This application is a continuation of and claims priority to PCT Patent Application PCT/CN2018/102160, filed on Aug. 24, 2018, which claims priority to Chinese Patent Application 201710747087.2, filed on Aug. 25, 2017. PCT Patent Application PCT/CN2018/102160 and Chinese Patent Application 201710747087.2 are incorporated herein by reference.

FIELD OF THE DISCLOSURE

The present disclosure relates to a wireless virtual mouse, and in particular relates to a mouse for an armless person.

BACKGROUND OF THE DISCLOSURE

According to the latest statistics from the China Disabled Persons' Federation, at present, the total number of people with disabilities in China has reached 85 million, accounting for 6% of the total number of people in the country. They are one of the special groups in developing countries that need the most attention. The comprehensive development of technology for disabled people, such as armless people, is getting more and more attention from society. Computer input devices are currently lacking for armless people. Although there are voice-assisted inputs, which can solve the function of general text input, cursor positioning and confirmation (i.e., selection of an item through a mouse-click) has not been resolved. Moreover, there are limitations to voice-assisted inputs such as being affected by environmental noise and user privacy. Although computer input devices controlled by two feet can realize cursor positioning and confirmation functionality, computer input devices controlled by feet have many limitations. For example, these computer input devices are large in size, inconvenient to use, have low operation efficiency, and consume a large amount of physical energy from the user.

BRIEF SUMMARY OF THE DISCLOSURE

The present disclosure provides a wireless virtual mouse to solve deficiencies of complicated structures of the existing techniques.

In order to solve the aforementioned technical problems, a first technical solution of the present disclosure is as follows.

A wireless virtual mouse comprises a head-mounted device and a wireless virtual mouse body. The wireless virtual mouse body comprises a head motion detection module, an eyelid blinking detection module, a communication module, and a power supply module. The head motion detection module collects relative changes of head position through an aerial attitude sensor. A wireless transceiver of the communication module sends signals generated based upon the relative changes of the head position to a computer, and a cursor on a screen of the computer changes synchronously based upon the signals so that cursor movement and cursor positioning of the wireless virtual mouse is achieved. The eyelid blinking detection module collects a movement distance and a movement duration of an eyelid through a photoelectric motion sensor, and the wireless transceiver sends change signals generated based upon the movement distance and the movement duration to the computer. The power supply module supplies power to the head motion detection module, the eyelid blinking detection module, and the communication module. When the movement distance of the eyelid reaches a preset distance and the movement duration of the eyelid is greater than a preset duration, a confirmation key of the wireless virtual mouse is selected, resulting in the computer receiving a mouse-click command.

In another preferred embodiment, the communication module sends the signals generated based upon the relative changes of the head position collected by the head motion detection module and the signals generated based upon the movement distance and the movement duration of the eyelid collected by the eyelid blinking detection module to the computer through a wireless transceiver to achieve a movement and a confirmation of a cursor of the wireless virtual mouse.

In another preferred embodiment, the head-mounted device comprises but is not limited to glasses, a hat, an earphone, a hair clip, a hair pin, or a headband, and at least a part of the wireless virtual mouse body is detachably disposed on the head-mounted device.

In another preferred embodiment, the wireless virtual mouse body comprises at least one of a charging port, an indicator light, or a signal sampling port.

In another preferred embodiment, the head-mounted device comprises glasses, and the glasses have a frame and temples. A lower end of the wireless virtual mouse body comprise a connection bracket, and the connection bracket is detachably disposed on at least one of the frame or the temples.

In another preferred embodiment, the signals generated based upon the relative changes of the head position comprise at least one of a head up signal, a head down signal, a head left signal, a head right signal, or a head inclined signal.

In another preferred embodiment, in the head motion detection module, a model of the aerial attitude sensor is MPU6000. The aerial attitude sensor comprises an eighth pin, a ninth pin, a twenty-third pin, a twenty-fourth pin, a tenth pin, a thirteenth pin, an eighteenth pin, and a twentieth pin. The eighth pin is connected to the wireless transceiver for serial peripheral interface (SPI) chip selection. The ninth pin is connected to the wireless transceiver to output SPI serial data. The twenty-third pin is connected to the wireless transceiver to achieve an SPI serial clock. The twenty-fourth pin is connected to the wireless transceiver to receive SPI serial data. The tenth pin is connected to a calibration filter capacitor. The thirteenth pin is a first power supply terminal connected to the power supply module. The eighteenth pin is power grounded. The twentieth pin is connected to a capacitor of a charge pump.

In another preferred embodiment, in the eyelid blink detection module, a model of the photoelectric motion sensor is PAW3205. The photoelectric motion sensor comprises a second pin, a third pin, a fourth pin, a fifth pin, a sixth pin, a seventh pin, and an eighth pin. The second pin is connected to the wireless transceiver to output serial peripheral interface (SPI) serial data. The third pin is connected to the wireless transceiver to receive SPI serial data. The fourth pin is connected to the wireless transceiver to achieve an SPI serial clock. The fifth pin is an input of a laser diode. The sixth pin is power grounded. The seventh pin is a second power supply terminal connected to the power supply module. The eighth pin is an output of a power regulator.

In another preferred embodiment, a model of the wireless transceiver is nRF20L01. The wireless transceiver comprises a first pin, a second pin, a third pin, a fourth pin, a fifth pin, a seventh pin, an eighth pin, a ninth pin, a tenth pin, an eleventh pin, a twelfth pin, a thirteenth pin, a fourteenth pin, a fifteenth pin, a sixteenth pin, a seventeenth pin, an eighteenth pin, a nineteenth pin, and a twentieth pin. The second pin, the third pin, the fourth pin, and the fifth pin are serial peripheral interface (SPI) serial ports and the photoelectric motion sensor is connected to the aerial attitude sensor through the second pin, the third pin, the fourth pin, and the fifth pin. The first pin is in a transmitting state when the first pin is not connected to anything. The ninth pin and the tenth pin are connected to a 16 MHz crystal oscillator. The sixteenth pin is connected to an external reference voltage supply. The nineteenth pin is an output of a digital power supply. The eleventh pin is an output of a power amplifier. The twelfth pin and the thirteenth pin are antenna terminals. The eighth pin, the fourteenth pin, the seventeenth pin, and the twentieth pin are power grounded. The seventh pin, the fifteenth pin, and the eighteenth pin are third power supply terminals connected to the power supply module.

In another preferred embodiment, the power supply module comprises a linear charge controller (such as MCP73831), a voltage regulator (such as RT9193), a common cathode diode, a light emitting diode, a power switch, and a battery interface. The linear charge controller comprises a first pin, a second pin, a third pin, a fourth pin, a sixth pin, a seventh pin, and an eighth pin. The first pin of the linear charge controller and the second pin of the linear charge controller are series connected and then connected to a power supply and a first end of a first capacitor. A second end of the first capacitor is grounded so that input filtering is achieved. The third pin is series connected to a first resistor and the light emitting diode and then is series connected with the fourth pin and is power grounded. The sixth pin is series connected to the seventh pin and the eighth pin series connected through a second capacitor so that output filtering is achieved. The common cathode diode is configured to charge and supply power at the same time. The light emitting diode is a charging indicator. The power switch is configured to switch the wireless virtual mouse to be opened and to be closed. The battery interface is configured to connect to a battery. The voltage regulator and peripheral circuits define a voltage regulator circuit, and the voltage regulator comprises a first pin and a second pin. The first pin of the voltage regulator is connected to two third capacitors connected in parallel and a first end of a second resistor, and a second end of the second resistor is connected to a fourth power supply terminal so that the output filtering is achieved. The second pin of the voltage regulator is connected to two fourth capacitors connected in parallel so that input filtering is achieved.

The technical solution of the present disclosure has the following advantages: it helps an armless person to achieve an input by way of a wireless virtual mouse to control a computer. As an auxiliary assembly, the head-mounted device is convenient to carry, and the at least a part of the wireless virtual mouse body can be removed and installed in different head-mounted devices. The head-mounted device has a wide applicable range, and it is applicable to many life scenarios. Compared with the existing virtual mice using legs and knees, the present disclosure uses head motion and eyelid blinking, so physical energy consumption is small and an operation efficiency is high. The wireless virtual mouse of the present disclosure can directly perform a confirmation key on a virtual keyboard of a computer without collecting a user's voice, so it is not affected by a noisy environment and the user's private voice information will not be leaked. The disclosure adopts wireless communication to realize the input of the virtual mouse to control the computer, and the user is free from being limited by a cable of traditional wired mouse and has a high degree of freedom. The present disclosure is not only particularly adaptable for a computer operation of armless person, but also adaptable for normal people to alleviate a "computer disease" of modern people, such as a mouse hand, a keyboard hand, or spinal diseases.

BRIEF DESCRIPTION OF THE DRAWING

The present disclosure will be further described below with the combination of the accompanying drawings together with the embodiments. However, the wireless virtual mouse of the present disclosure will not be limited to the embodiments.

DETAILED DESCRIPTION OF THE EMBODIMENTS

Embodiment 1

Figure 1:
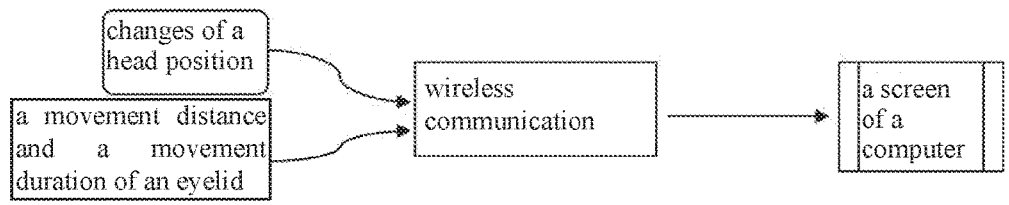
FIG. 1 illustrates a diagram of a working principle of the present disclosure.

Referring to FIG. 1, a working principle of a wireless virtual mouse of the present disclosure is to convert relative changes of a head position and a movement distance and a movement duration of an eyelid into electrical signals, then wirelessly send the electrical signals to a computer to complete cursor movement and confirmation (e.g., mouse-click or selection) of a computer mouse.

Figure 4:
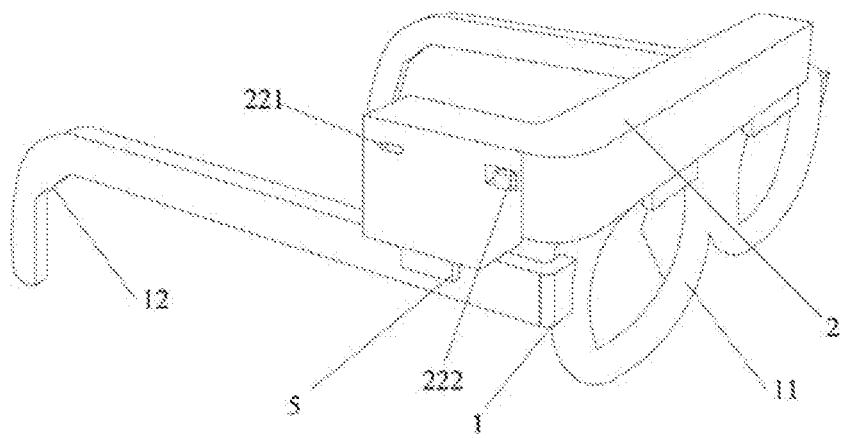
FIG. 4 illustrates a first schematic view of glasses of the preferred embodiment of the present disclosure.
Figure 5:
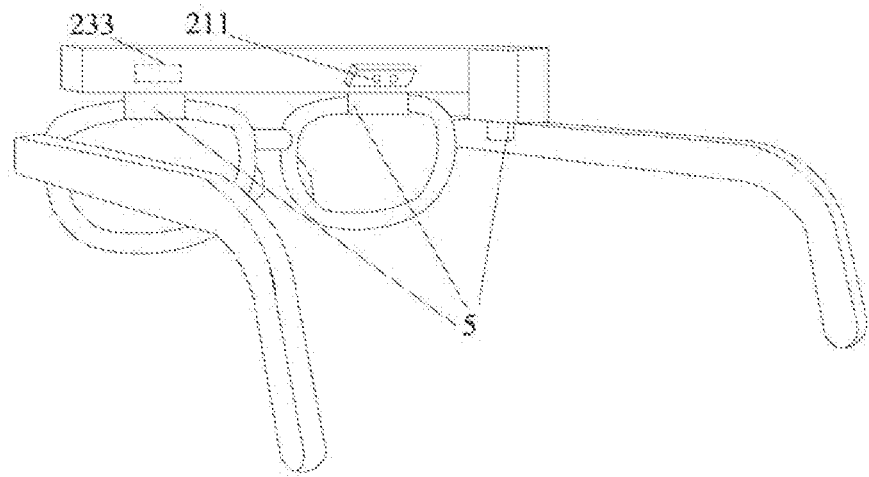
FIG. 5 illustrates a second schematic view of the glasses of the preferred embodiment of the present disclosure.

Referring to FIGS. 4 and 5, a wireless virtual mouse of the present disclosure comprises a head-mounted device 1 and a wireless virtual mouse body 2. In this embodiment, the head-mounted device comprises glasses 1, and the glasses 1 comprise a frame 11 and two temples 12. The wireless virtual mouse body 2 is detachably connected to an upper end of the frame 11 and the temples 12 through a bracket 5. The wireless virtual mouse body 2 comprises a power socket 221, a power switch 222, an eyelid blinking sampling port 211, and a head motion sampling port 233. This solution is adaptable to various glasses with different standards and sizes, different uses, and in different scenarios.

Figure 2:
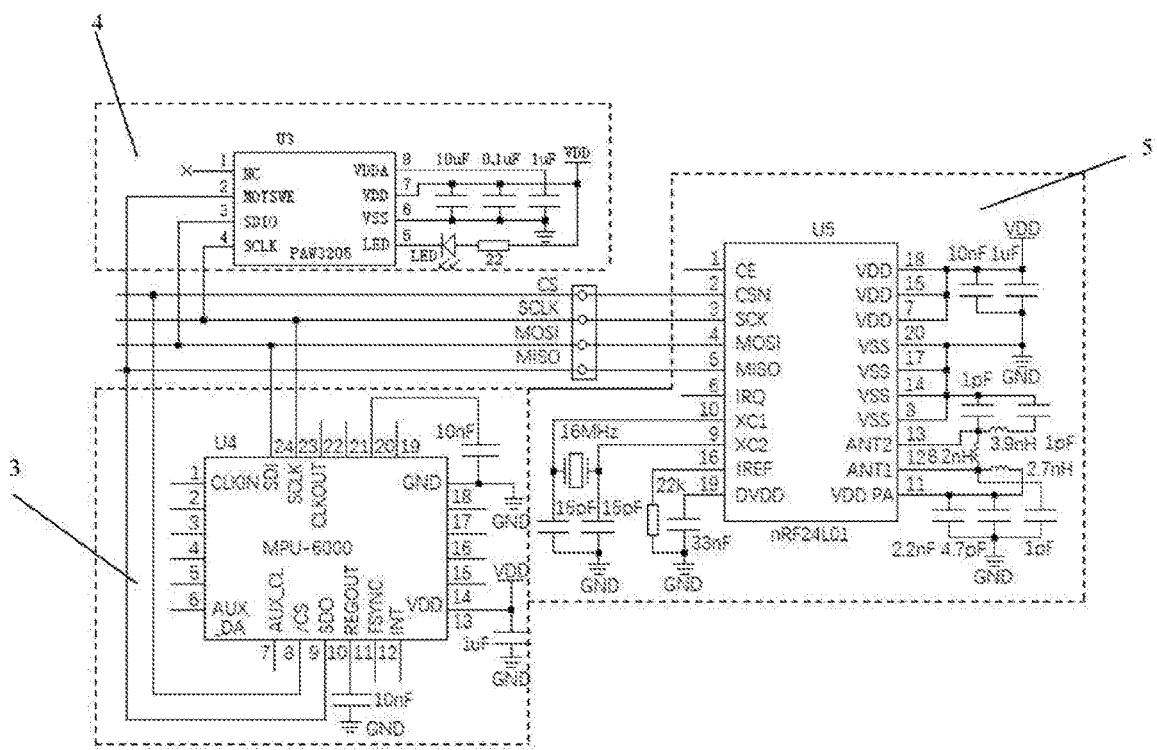
FIG. 2 illustrates a schematic diagram of a circuit of a wireless virtual mouse of a preferred embodiment of the present disclosure.

With reference to FIG. 2, the wireless virtual mouse body 2 comprises a head motion detection module 3, an eyelid blinking detection module 4, a communication module 5, and a power supply module 6. The head motion detection module 3 collects relative changes of the head position through an aerial attitude sensor. Signals generated based upon the relative changes of the head position comprise at least one of a head up signal, a head down signal, a head left signal, a head right signal, or a head inclined signal. The signals generated based upon the relative changes of the head position are sent to the computer through the communication module 5. A cursor on a screen of the computer changes synchronously based upon the signals so that the cursor movement and cursor positioning of the wireless virtual mouse is achieved. The eyelid blinking detection module 4 collects a movement distance and a movement duration of eyelid through a photoelectric motion sensor. The communication module 5 sends change signals generated based upon the movement distance of the eyelid and the movement duration of the eyelid to the computer. When the movement distance of the eyelid reaches a preset distance corresponding to closed eye and the movement duration of the eyelid is greater than a preset duration corresponding to a duration longer than a typical eye blink, a confirmation key of the wireless virtual mouse is considered valid, and the confirmation of the wireless virtual mouse is achieved. The communication module 5 sends the signals generated based upon the relative changes of the head position collected by the head motion detection module 3 and the signals generated based upon the movement distance and the movement duration of the eyelid collected by the eyelid blinking detection module 4 to the computer through a wireless transceiver to achieve the cursor movement and confirmation of the wireless virtual mouse. The power supply module 6 supplies power to the head motion detection module 3, the eyelid blinking detection module 4, and the communication module 5.

In this embodiment, a schematic diagram of a circuit of the wireless virtual mouse is shown in FIG. 2, the circuit comprises three chips. A photoelectric motion sensor PAW3205 corresponding to the eyelid blinking detection module 4, an aerial attitude sensor MPU6000 corresponding to the head motion detection module 3, and a wireless transceiver circuit nRF20L01 corresponding to the communication module 5.

The photoelectric motion sensor PAW3205 of the eyelid blinking detection module 4 is an optical sensor with high-performance and low-power, and is manufactured by complementary metal oxide semiconductor (CMOS) processes. The photoelectric motion sensor PAW3205 and peripheral components define the eyelid blinking detection module. Therefore, the confirmation of the wireless virtual mouse is achieved. The photoelectric motion sensor PAW3205 comprises a first pin, a second pin, a third pin, a fourth pin, a fifth pin, a sixth pin, a seventh pin, and an eighth pin. The first pin is not connected to anything, the second pin is a motion detection output and is connected to a fifth pin of the wireless transceiver circuit nRF20L01 to output serial peripheral interface (SPI) serial data, the third pin is an input/output (I/O) serial port and is connected to a fourth pin of the wireless transceiver circuit nRF20L01 to receive SPI serial data, the fourth pin is a serial clock terminal and is connected to a third pin of the wireless transceiver circuit nRF20L01 to achieve SPI serial clock, the fifth pin is an input of a laser diode (LD), the sixth pin is power grounded, the seventh pin is a first power supply terminal, and the eighth pin is an output of a power regulator. The circuit enables the photoelectric motion sensor PAW3205 to communicate with the wireless transceiver circuit nRF20L01 through the SPI serial port. When the user blinks his/her upper eyelid, the photoelectric motion sensor PAW3205 collects the movement distance and movement duration of eyelid. When the movement distance of the eyelid reaches a preset distance corresponding to a closed eye and the movement duration is greater than a preset duration, such as greater than 500 milliseconds, the confirmation of the key is valid, and the confirmation of the key of the wireless virtual mouse is achieved.

The aerial attitude sensor MPU6000 comprises a 3-axis gyroscope and a 3-axis accelerometer. The 3-axis gyroscope and the 3-axis accelerometer respectively use three 16-bit analog-to-digital converters (ADCs) to convert a measured analog quantity into an outputable digital quantity. The aerial attitude sensor MPU6000 and peripheral components define a head motion detection module 3 to achieve the cursor movement and the cursor positioning of the wireless virtual mouse. The aerial attitude sensor MPU6000 comprises a first pin, a second pin, a third pin, a fourth pin, a fifth pin, a sixth pin, a seventh pin, an eighth pin, a ninth pin, a tenth pin, an eleventh pin, a twelfth pin, a thirteenth pin, a fourteenth pin, a fifteenth pin, a sixteenth pin, a seventeenth pin, an eighteenth pin, a nineteenth pin, a twentieth pin, a twenty-first pin, a twenty-second pin, a twenty-third pin, and a twenty-fourth pin. The first pin is an input of an optional external clock, the sixth pin is for inter-integrated circuit (FC) main serial data and is not used, the seventh pin is the FC main serial clock and is not used, the eighth pin is connected to a second pin of the wireless transceiver nRF20L01 to achieve SPI chip selection, the ninth pin is connected to the fifth pin of the wireless transceiver nRF20L01 output SPI serial data, the tenth pin is connected to a calibration filter capacitor, the eleventh pin is for frame synchronous digital input and is not used, the twelfth pin is for interrupt digital output and is not used, the thirteenth pin is a second power supply terminal, the eighteenth pin is power grounded, the nineteenth pin, the twenty-first pin, and the twenty-second pin are reserved and not used, the twentieth pin is connected to a capacitor of a charge pump, the twenty-third pin is connected to the third pin of the wireless transceiver circuit nRF20L01 to achieve the SPI serial clock, the twenty-fourth pin is connected to the fourth pin of the wireless transceiver circuit nRF20L01 to receive SPI serial data, and the second pin, the third pin, the fourth pin, the fifth pin, the fourteenth pin, the fifteenth pin, the sixteenth pin, and the seventeenth pin are not connected. The circuit enables the aerial attitude sensor MPU6000 to communicate with the wireless transceiver circuit nRF20L01 through the SPI serial port. When the user moves his/her head, the aerial attitude sensor MPU6000 collects relative changes of head up, head down, head left, head right, and/or head inclined, and sends signals generated based upon the relative changes to the computer so that the cursor on the screen changes synchronously, and the cursor movement and the cursor positioning of the wireless virtual mouse are achieved, thereby enabling the wireless virtual mouse to have the functionality of a scroll wheel.

The wireless transceiver circuit nRF20L01 and peripheral components define the communication module 5 to enable wireless communication to be achieved. The wireless transceiver circuit nRF20L01 comprises a first pin, the second pin, the third pin, the fourth pin, the fifth pin, a sixth pin, a seventh pin, an eighth pin, a ninth pin, a tenth pin, an eleventh pin, a twelfth pin, a thirteenth pin, a fourteenth pin, a fifteenth pin, a sixteenth pin, a seventeenth pin, an eighteenth pin, a nineteenth pin, and a twentieth pin. The first pin is in a transmitting state when the first pin is not connected to anything, the second pin, the third pin, the fourth pin, and the fifth pin are SPI serial ports, the sixth pin is an input of data and is not used, the ninth pin and the tenth pin are connected to a 16 MHz crystal oscillator, the sixteenth pin is connected to an external reference voltage supply, the nineteenth pin is an output of a digital power supply, the eleventh pin is an output of a power amplifier, the twelfth pin and the thirteenth pin are antenna terminals, the eighth pin, the fourteenth pin, the seventeenth pin, and the twentieth pin are power grounded, and the seventh pin, the fifteenth pin, and the eighteenth pin are third power supply terminals.

The aerial attitude sensor MPU6000 and the photoelectric motion sensor PAW3205 communicate with the wireless transceiver circuit nRF20L01 through the SPI serial ports. The aerial attitude sensor MPU6000 sends first signals corresponding to the cursor movement and the cursor positioning, the photoelectric motion sensor PAW3205 sends second signals corresponding to the confirmation key, and the wireless transceiver circuit nRF20L01 sends the first signals and the second signals to the computer to achieve an input operation of the wireless virtual mouse.

Figure 3:
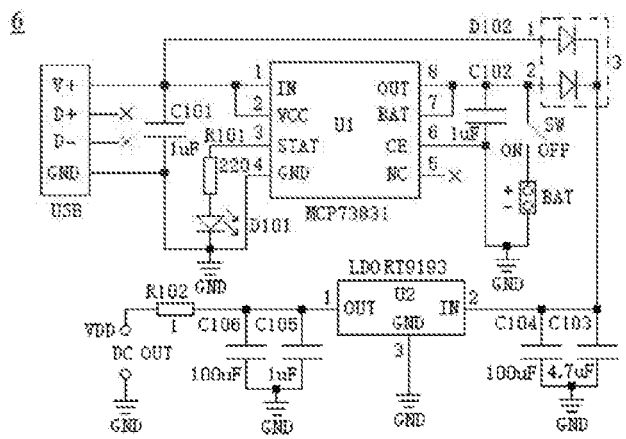
FIG. 3 illustrates a schematic diagram of a circuit of a power supply module of the preferred embodiment of the present disclosure.

In this embodiment, a schematic diagram of a circuit of the power supply module 6 of the wireless virtual mouse is shown in FIG. 3. A linear charge controller MCP73831 and peripheral circuits define a lithium battery charge circuit. The linear charge controller MCP73831 comprises a first pin, a second pin, a third pin, a fourth pin, a fifth pin, a sixth pin, a seventh pin, and an eighth pin. The first pin of the linear charge controller MCP73831 and the second pin of the linear charge controller MCP73831 are series connected and then connected to a power supply and a first capacitor C101 so that input filtering is achieved. The third pin is series connected to a first resistor R101 and a light emitting diode D101 and then is series connected with the fourth pin and is power grounded, the fifth pin is not connected to anything, and the sixth pin is series connected to the seventh pin and the eighth pin, where series connected through a second capacitor C102 so that output filtering is achieved. The power supply module 6 comprises a common cathode diode D102, which is configured to charge and supply power at the same time, a light emitting diode D101, which serves as a charging indicator, a power switch SW1 configured to switch the wireless virtual mouse switch to be opened and to be closed, and a battery interface BAT configured to connect to a battery. A voltage regulator RT9193 and peripheral circuits define a voltage regulator circuit. The voltage regulator RT9193 comprises a first pin of the voltage regulator RT9193 and a second pin of the voltage regulator RT9193. The first pin of the voltage regulator RT9193 is an output end and is connected to a first end of each of two third capacitors C105 and C106, and a first end of a second resistor R102. A second end of the third capacitor C105 and a second end of the third capacitor C106 are connected to the ground, a second end of the second resistor R102 is connected to a fourth power supply terminal, so that output filtering is achieved, and the second pin of the voltage regulator RT9193 is an input terminal and is connected to two fourth capacitors C102 and C103 connected in parallel, so that input filtering is achieved. The power supply module 6 supplies power to the head motion detection module 3, the eyelid blinking detection module 4, and the communication module 5.

It will be apparent to those skilled in the art that various modifications and variation can be made in the present disclosure without departing from the spirit or scope of the invention. Thus, it is intended that the present disclosure cover the modifications and variations of this invention provided they come within the scope of the appended claims and their equivalents.

What is claimed is:

1. A wireless virtual mouse, comprising:
   a head-mounted device, and
   a wireless virtual mouse body, wherein:
   the wireless virtual mouse body comprises a head motion detection module, an eyelid blinking detection module, a communication module, and a power supply module,
   the head motion detection module collects relative changes of head position through an aerial attitude sensor,
   a wireless transceiver of the communication module sends signals generated based upon the relative changes of the head position to a computer,
   a cursor on a screen of the computer changes synchronously based upon the signals so that cursor movement and cursor positioning of the wireless virtual mouse is achieved,
   the eyelid blinking detection module collects a movement distance and a movement duration of an eyelid through a photoelectric motion sensor,
   the wireless transceiver sends change signals generated based upon the movement distance and the movement duration to the computer,
   the power supply module supplies power to the head motion detection module, the eyelid blinking detection module, and the communication module,
   the photoelectric motion sensor comprises a second pin, a third pin, a fourth pin, a fifth pin, a sixth pin, a seventh pin, and an eighth pin,
   the second pin of photoelectric motion sensor is connected to the wireless transceiver to output serial peripheral interface (SPI) serial data,
   the third pin of photoelectric motion sensor is connected to the wireless transceiver to receive SPI serial data,
   the fourth pin of photoelectric motion sensor is connected to the wireless transceiver to achieve an SPI serial clock,
   the fifth pin of photoelectric motion sensor is an input of a laser diode,
   the sixth pin of photoelectric motion sensor is power grounded,
   the seventh pin of photoelectric motion sensor is a first power supply terminal connected to the power supply module,
   the eighth pin of photoelectric motion sensor is an output of a power regulator, and
   when the movement distance of the eyelid reaches a preset distance and the movement duration of the eyelid is greater than a preset duration:
      a confirmation key of the wireless virtual mouse is selected, resulting in the computer receiving a mouse-click command.

2. The wireless virtual mouse according to claim 1, wherein:
   the head-mounted device comprises glasses, a hat, an earphone, a hair clip, a hair pin, or a headband, and
   at least a part of the wireless virtual mouse body is detachably disposed on the head-mounted device.

3. The wireless virtual mouse according to claim 1, wherein the wireless virtual mouse body comprises at least one of a charging port, an indicator light, or a signal sampling port.

4. The wireless virtual mouse according to claim 1, wherein:
   the head-mounted device comprises glasses,
   the glasses have a frame and temples,
   a lower end of the wireless virtual mouse body comprises a connection bracket, and
   the connection bracket is detachably disposed on at least one of the frame or the temples.

5. The wireless virtual mouse according to claim 1, wherein the signals generated based upon the relative changes of the head position comprise at least one of a head up signal, a head down signal, a head left signal, a head right signal, or a head inclined signal.

6. The wireless virtual mouse according to claim 1, wherein:

the aerial attitude sensor comprises an eighth pin, a ninth pin, a twenty-third pin, a twenty-fourth pin, a tenth pin, a thirteenth pin, an eighteenth pin, and a twentieth pin, the eighth pin of the aerial attitude sensor is connected to the wireless transceiver for (SPI chip selection, the ninth pin of the aerial attitude sensor is connected to the wireless transceiver to output the SPI serial data, the twenty-third pin of the aerial attitude sensor is connected to the wireless transceiver to achieve the SPI serial clock, the twenty-fourth pin of the aerial attitude sensor is connected to the wireless transceiver to receive the SPI serial data, the tenth pin of the aerial attitude sensor is connected to a calibration filter capacitor, the thirteenth pin of the aerial attitude sensor is a second power supply terminal connected to the power supply module, the eighteenth pin of the aerial attitude sensor is power grounded, and the twentieth pin of the aerial attitude sensor is connected to a capacitor of a charge pump.

7. The wireless virtual mouse according to claim 1, wherein:

the wireless transceiver comprises a first pin, a second pin, a third pin, a fourth pin, a fifth pin, a seventh pin, an eighth pin, a ninth pin, a tenth pin, an eleventh pin, a twelfth pin, a thirteenth pin, a fourteenth pin, a fifteenth pin, a sixteenth pin, a seventeenth pin, an eighteenth pin, a nineteenth pin, and a twentieth pin, the second pin of the wireless transceiver, the third pin of the wireless transceiver, the fourth pin of the wireless transceiver, and the fifth pin of the wireless transceiver are (SPI serial ports and the photoelectric motion sensor is connected to the aerial attitude sensor through the second pin of the wireless transceiver, the third pin of the wireless transceiver, the fourth pin of the wireless transceiver, and the fifth pin of the wireless transceiver, the first pin of the wireless transceiver is in a transmitting state when the first pin of the wireless transceiver is not connected to anything, the ninth pin of the wireless transceiver and the tenth pin of the wireless transceiver are connected to a 16 MHz crystal oscillator, the sixteenth pin of the wireless transceiver is connected to an external reference voltage supply, the nineteenth pin of the wireless transceiver is an output of a digital power supply, the eleventh pin of the wireless transceiver is an output of a power amplifier, the twelfth pin of the wireless transceiver and the thirteenth pin of the wireless transceiver are antenna terminals, the eighth pin of the wireless transceiver, the fourteenth pin of the wireless transceiver, the seventeenth pin of the wireless transceiver, and the twentieth pin of the wireless transceiver are power grounded, and the seventh pin of the wireless transceiver, the fifteenth pin of the wireless transceiver, and the eighteenth pin of the wireless transceiver are third power supply terminals connected to the power supply module.

8. The wireless virtual mouse according to claim 1, wherein:

the power supply module comprises a linear charge controller, a voltage regulator, a common cathode diode, a light emitting diode, a power switch, and a battery interface, the linear charge controller comprises a first pin, a second pin, a third pin, a fourth pin, a sixth pin, a seventh pin, and an eighth pin, the first pin of the linear charge controller and the second pin of the linear charge controller are series connected and then connected to a power supply and a first end of a first capacitor, a second end of the first capacitor is grounded so that input filtering is achieved, the third pin of the linear charge controller is series connected to a first resistor and the light emitting diode and then is series connected with the fourth pin of the linear charge controller and is power grounded, the sixth pin of the linear charge controller is series connected to the seventh pin of the linear charge controller and the eighth pin of the linear charge controller through a second capacitor so that output filtering is achieved, the common cathode diode is configured to charge and supply power at the same time, the light emitting diode is a charging indicator, the power switch is configured to switch the wireless virtual mouse to be opened and to be closed, the battery interface is configured to connect to a battery, the voltage regulator and peripheral circuits define a voltage regulator circuit, the voltage regulator comprises a first pin and a second pin, the first pin of the voltage regulator is connected to two third capacitors connected in parallel and a first end of a second resistor, a second end of the second resistor is connected to a fourth power supply terminal so that the output filtering is achieved, and the second pin of the voltage regulator is connected to two fourth capacitors connected in parallel so that the input filtering is achieved.

9. A wireless virtual mouse, comprising:

a head-mounted device, and a wireless virtual mouse body, wherein:

the wireless virtual mouse body comprises a head motion detection module, an eyelid blinking detection module, a communication module, and a power supply module, the head motion detection module collects relative changes of head position through an aerial attitude sensor, a wireless transceiver of the communication module sends signals generated based upon the relative changes of the head position to a computer, a cursor on a screen of the computer changes synchronously based upon the signals so that cursor movement and cursor positioning of the wireless virtual mouse is achieved, the eyelid blinking detection module collects a movement distance and a movement duration of an eyelid through a photoelectric motion sensor, the wireless transceiver sends change signals generated based upon the movement distance and the movement duration to the computer, the power supply module supplies power to the head motion detection module, the eyelid blinking detection module, and the communication module, the aerial attitude sensor comprises an eighth pin, a ninth pin, a twenty-third pin, a twenty-fourth pin, a tenth pin, a thirteenth pin, an eighteenth pin, and a twentieth pin, the eighth pin is connected to the wireless transceiver for serial peripheral interface (SPI) chip selection, the ninth pin is connected to the wireless transceiver to output SPI serial data, the twenty-third pin is connected to the wireless transceiver to achieve an SPI serial clock, the twenty-fourth pin is connected to the wireless transceiver to receive SPI serial data, the tenth pin is connected to a calibration filter capacitor, the thirteenth pin is a first power supply terminal connected to the power supply module, the eighteenth pin is power grounded, the twentieth pin is connected to a capacitor of a charge pump, and when the movement distance of the eyelid reaches a preset distance and the movement duration of the eyelid is greater than a preset duration:
a confirmation key of the wireless virtual mouse is selected, resulting in the computer receiving a mouse-click command.

10. The wireless virtual mouse according to claim 9, wherein:
the head-mounted device comprises glasses, a hat, an earphone, a hair clip, a hair pin, or a headband, and
at least a part of the wireless virtual mouse body is detachably disposed on the head-mounted device.

11. The wireless virtual mouse according to claim 9, wherein the wireless virtual mouse body comprises at least one of a charging port, an indicator light, or a signal sampling port.

12. The wireless virtual mouse according to claim 9, wherein:
the head-mounted device comprises glasses,
the glasses have a frame and temples,
a lower end of the wireless virtual mouse body comprises a connection bracket, and
the connection bracket is detachably disposed on at least one of the frame or the temples.

13. The wireless virtual mouse according to claim 9, wherein the signals generated based upon the relative changes of the head position comprise at least one of a head up signal, a head down signal, a head left signal, a head right signal, or a head inclined signal.

14. A wireless virtual mouse, comprising:
a head-mounted device, and
a wireless virtual mouse body, wherein:
the wireless virtual mouse body comprises a head motion detection module, an eyelid blinking detection module, a communication module, and a power supply module,
the head motion detection module collects relative changes of head position through an aerial attitude sensor,
a wireless transceiver of the communication module sends signals generated based upon the relative changes of the head position to a computer,
a cursor on a screen of the computer changes synchronously based upon the signals so that cursor movement and cursor positioning of the wireless virtual mouse is achieved, the eyelid blinking detection module collects a movement distance and a movement duration of an eyelid through a photoelectric motion sensor, the wireless transceiver sends change signals generated based upon the movement distance and the movement duration to the computer, the power supply module supplies power to the head motion detection module, the eyelid blinking detection module, and the communication module, the wireless transceiver comprises a first pin, a second pin, a third pin, a fourth pin, a fifth pin, a seventh pin, an eighth pin, a ninth pin, a tenth pin, an eleventh pin, a twelfth pin, a thirteenth pin, a fourteenth pin, a fifteenth pin, a sixteenth pin, a seventeenth pin, an eighteenth pin, a nineteenth pin, and a twentieth pin, the second pin, the third pin, the fourth pin, and the fifth pin are serial peripheral interface (SPI) serial ports and the photoelectric motion sensor is connected to the aerial attitude sensor through the second pin, the third pin, the fourth pin, and the fifth pin, the first pin is in a transmitting state when the first pin is not connected to anything, the ninth pin and the tenth pin are connected to a 16 MHz crystal oscillator, the sixteenth pin is connected to an external reference voltage supply, the nineteenth pin is an output of a digital power supply, the eleventh pin is an output of a power amplifier, the twelfth pin and the thirteenth pin are antenna terminals, the eighth pin, the fourteenth pin, the seventeenth pin, and the twentieth pin are power grounded, the seventh pin, the fifteenth pin, and the eighteenth pin are third power supply terminals connected to the power supply module, and when the movement distance of the eyelid reaches a preset distance and the movement duration of the eyelid is greater than a preset duration:
a confirmation key of the wireless virtual mouse is selected, resulting in the computer receiving a mouse-click command.

15. The wireless virtual mouse according to claim 14, wherein:
the head-mounted device comprises glasses, a hat, an earphone, a hair clip, a hair pin, or a headband, and
at least a part of the wireless virtual mouse body is detachably disposed on the head-mounted device.

16. The wireless virtual mouse according to claim 14, wherein the wireless virtual mouse body comprises at least one of a charging port, an indicator light, or a signal sampling port.

17. The wireless virtual mouse according to claim 14, wherein:
the head-mounted device comprises glasses,
the glasses have a frame and temples,
a lower end of the wireless virtual mouse body comprises a connection bracket, and
the connection bracket is detachably disposed on at least one of the frame or the temples.

18. The wireless virtual mouse according to claim 14, wherein the signals generated based upon the relative changes of the head position comprise at least one of a head up signal, a head down signal, a head left signal, a head right signal, or a head inclined signal.

* * * * *